United States Patent [19]

Frey et al.

[11] Patent Number: 4,833,220

[45] Date of Patent: May 23, 1989

[54] PROCESS FOR PREPARING MOLDINGS BASED ON SILICON OXYCARBIDE

[75] Inventors: Volker Frey; Bernd Pachaly; Norbert Zeller, all of Burghausen, Fed. Rep. of Germany

[73] Assignee: Wacker-Chemie GmbH, Munich, Fed. Rep. of Germany

[21] Appl. No.: 207,982

[22] Filed: Jun. 17, 1988

[30] Foreign Application Priority Data

Jul. 8, 1987 [DE] Fed. Rep. of Germany ....... 3722602

[51] Int. Cl.$^4$ .......................................... C08F 283/00
[52] U.S. Cl. ................................. 525/477; 525/475; 528/10; 528/33; 528/39
[58] Field of Search ............................ 528/10, 33, 39; 525/475, 477

[56] References Cited

U.S. PATENT DOCUMENTS 3,684,756  8/1972  Brooks ................................. 525/475
4,631,208  12/1986  Westall ................................. 525/477

Primary Examiner—Melvyn I. Marquis

[57] ABSTRACT

The invention relates to a process for preparing moldings based on silicon oxycarbide, which comprises reacting a molding containing from 50 to 90 percent by weight of silicon oxycarbide having an average particle size of from 0.5 to 50 um with from 10 to 50 percent by weight of a silicone resin having the general formula $$[(CH_3SiO)_x(OR)_y(OH)_z]_n,$$

in which R is an alkyl radical having from 1 to 4 carbon atoms, x is in the range of from 1.4 to 1.5, y is in the range of from 0 to 0.08, z is in the range of from 0 to 0.08 and n is in the range of from 20 to 40, under a nonoxidizing atmosphere or in a vacuum at temperatures in the range of from 700° to 1500° C.

7 Claims, No Drawings

PROCESS FOR PREPARING MOLDINGS BASED ON SILICON OXYCARBIDE

The present invention relates to molding and more particularly to a process for preparing moldings by reacting silicon oxycarbide with silicone resins.

BACKGROUND OF THE INVENTION

Carbon-containing, monolithic glasses obtained from gels of organosilsequioxanes of the general formula $RSiO_{3/2}$ are described in European Pat. No. EP-A 107,943. Moldings which are defect-free can be obtained only by involved drying procedures, and even then the reproducibility of the dimensions of the moldings is not assured.

It is an object of the present invention to provide a process for preparing defect-free moldings containing silicon oxycarbide which have reproducible dimensions. A further object of the present invention is to provide a process for preparing moldings which avoid involved drying and treatment processes.

SUMMARY OF THE INVENTION

The foregoing objects and others which will become apparent from the following description are accomplished in accordance with this invention, generally speaking, by providing a process for preparing moldings based on silicon oxycarbide, which comprises reacting a molding containing from 50 to 90 percent by weight of silicon oxycarbide having an average particle size of from 0.5 to 50 um with from 10 to 50 percent by weight of a silicone resin having the general formula $$[(CH_3SiO)_x(OR)_y(OH)_z]_n,$$

in which R is an alkyl radial having 1 to 4 carbon atoms and x is in the range of from 1.4 to 1.5, y is in the range of from 0 to 0.08, z is in the range of from 0 to 0.08 and n is in the range of from 20 to 40, under a nonoxidizing atmosphere or in a vacuum at temperatures in the range of from 700° to 1500° C.

DESCRIPTION OF THE INVENTION

The invention relates to a process for preparing molding which comprises reacting silicon oxycarbide with a silicone resin of the formula $$[(CH_3SiO)_x(OR)_y(OH)_z]_n$$

in which R, x, y, z and n are the same as above, at a temperature of from 700° to 1500° C. in a nonoxidizing atmosphere or in a vacuum.

Examples of alkyl radicals represented by R which have from 1 to 4 carbon atoms are methyl, ethyl, isopropyl and n-butyl radicals.

The preferred temperature range employed in the process of this invention is within the range of from 1000 to 1300° C. In the process of this invention, a reproducible shrinkage in volume of from 5 to 25 percent takes place, depending on the composition selected for the molding, which is of great importance in producing molding having reproducible dimensions. The loss in weight is from 2.5 to 10.0 percent.

The reaction is carried out under a nonoxidizing atmosphere, i.e., under an inert atmosphere, such as nitrogen or argon, or under a reducing atmosphere, such as carbon monoxide or hydrogen, or under vacuum. The heating cycle must be adapted to suit the particular problems encountered and depends essentially on the size and shape of the molding.

The moldings reacted in accordance with this invention can produce articles of any kind, for example panels, bars or tubes.

The moldings reacted in accordance with this invention are shaped in a manner known, per se, such as by rolling, compressing, extruding, injection molding, blow molding, casting or spread coating thermoplastic and pourable compositions containing from 50 to 90 percent by weight of silicon oxycarbide having an average particle size of from 0.5 to 50 um and from 10 to 50 percent by weight of a silicone resin of the general formula $$[(CH_3SiO)_x(OR)_y(OH)_z]_n,$$

in which R is a methyl, ethyl, isopropyl or n-butyl radical and x is in the range of from 1.4 to 1.5, y is in the range of from 0 to 0.08, z is in the range of from 0 to 0.08 and n is in the range of from 20 to 40.

The thermoplastic and castable compositions containing from 50 to 90 percent by weight of silicon oxycarbide having an average particle size of from 0.5 to 50 um and from 10 to 50 percent by weight of silicone resin of the general formula $$[(CH_3SiO)_x(OR)_y(OH)_z]_n,$$

in which R is a methyl, ethyl, isopropyl or n-butyl radical and x is in the range of from 1.4 to 1.5, y is in the range of from 0 to 0.08, z is in the range of from 0 to 0.08 and n is in the range of from 20 to 40, is prepared in a known manner, such as by stirring the silicon oxycarbide into a solution containing an organic solvent and the silicone resin and subsequently removing the solvent by evaporation.

The thermoplastic and castable compositions containing silicon oxycarbide and silicone resin having the above formula may also be prepared by incorporating the silicon oxycarbide into molten silicone resin on rolls or kneaders at 60 to 150° C., and, if appropriate, with the addition of lubricants or plasticizers, such as paraffins, polyglycols or phthalates. Also, these thermoplastic and castable compositions containing silicon oxycarbide and silicon resin having the above formula may be prepared by spray-drying a solution of the silicone resin, and silicon oxycarbide in an organic solvent in a fluidized bed granulator. The preferred organic solvent is a hydrocarbon solvent such as toluene and xylene.

Preferred compositions of the moldings reacted in accordance with this invention contain from 50 to 80 percent by weight of silicon oxycarbide having an average particle size of from 0.5 to 50 um, preferably from 0.5 to 25 um, and from 20 to 50 percent by weight of silicone resin of the general formula $$[(CH_3SiO)_x(OR)_y(OH)_z]_n,$$

in which R is a methyl, ethyl, isopropyl or n-butyl radical and x is in the range of from 1.4 to 1.5, y is in the range of from 0 to 0.08, z is in the range of from 0 to 0.08 and n is in the range of from 20 to 40. The preferred radical represented by R is the methyl radical. A preferred range for x is from 1.44 to 1.46. A preferred range for y is from 0.065 to 0.070. A preferred range for z is from 0.03 to 0.04, while the preferred range for n is from 25 to 35. It is preferred that spherical silicon oxycarbide having an average particle size of 0.5 to 25 um, and more preferably a particle size of from 0.5 to 15 um be used.

The silicon oxycarbide used is preferably prepared by pyrolyzing pulverulent, infusible and insoluble methylsilicic acids having an average particle size of from 0.7 to 70 um, and more preferably from 0.7 to 34 um, under an inert atmosphere or under a vacuum at temperatures in the range of from 800° to 1300° C., and more preferably from 900 to 1200° C. The methylsilicic acids are prepared in a known manner, such as by hydrolyzing methyl trichlorosilane or $CH_3Si(OR)_3$ in which R is a methyl, ethyl or isopropyl radical. Processes for preparing methylsilicic acids are described in W. Noll, Chemistry and Technology of Silicones, Academic Press Inc., Orlando 1968.

Spherical methylsilicic acid powders obtained by spray drying hydrosols containing methyl trimethoxysilanes $[CH_3Si(OCH_3)_3]$, are especially preferred. A process for preparing these spherical methylsilicic acid powders is described in German Patent Application No. P 37 17 073.2.

Silicone resins of the general formula

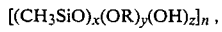
$[(CH_3SiO)_x(OR)_y(OH)_z]_n$, in which R can be a methyl, ethyl, isopropyl or n-butyl radical and x is in the range of from 1.4 to 1.5, y is in the range of from 0 to 0.08, z is in the range of from 0 to 0.08 and n is in the range of from 20 to 40, are known compounds and are readily prepared by conventional processes. Conventional processes for preparing these silicone resins are described in W. Noll, Chemistry and Technology of Silicones, Academic Press Inc., Orlando 1968.

Defect-free moldings containing silicon oxycarbide and having reproducible dimensions are obtained by the process of this invention in the absence of involved drying and treatment steps. The moldings produced in accordance with this invention have a density of from 1.8 to 2.3 $g/cm^3$ and a porosity of from 1 to 20 percent. Their electrical conductivity is very low. The resistance of the moldings to heat and chemicals is very good, and they are resistant to oxidation in air up to 1300° C.

The moldings produced in accordance with this invention are used, for example, as elements in electrical equipment, such as, casing components, supports for windings or insulators, and as components for high-temperature applications, such as nozzles, slide valves, tubes and rotors.

EXAMPLE 1

Preparation of a hydrosol composed of $CH_3Si(OCH_3)_3$

About 170 g of methyltrimethoxysilane were added dropwise at 65° C., with stirring and over a period of 30 minutes, to a mixture containing 1100 ml of water and 6 g of dodecylbenzene sulfonic acid. After stirring for 30 minutes, 250 ml of a methanol-water mixture were distilled off at 400 mbar. An additional 170 g of methyltrimethoxysilane were added dropwise at 65° C. over a period of 30 minutes. After stirring for 30 minutes, 250 ml of a methanol-water mixture were distilled off at 400 mbar. An opaque hydrosol, which was stable on storage and having a 20 percent solids content, an average particle size of 20 nm and a viscosity of 25 mPa.s was formed.

EXAMPLE 2

Preparation of a methylsilicic acid powder

The hydrosol prepared in accordance with Example 1 was spray dried in an atomizing drier of the Nubilosa AJM 014 type (Nubilosa is a registered trademark) at a nozzle pressure of 5 bar, an air inlet temperature of 170° C. and an outlet temperature of 85° C., to give a methylsilicic acid powder having a residual moisture content of less than 0.8 percent, a tamped density of 300 g/l, a BET specific surface area of 360 $m^2/g$ and an average secondary particle size of 3 micrometers.

EXAMPLE 3

Preparation of a silicon oxycarbide powder

About 1000 g of the methylsilicic acid powder prepared in accordance with Example 2 were heated to 1100° C. in a chamber furnace equipped with argon flushing. After cooling, 710 g of a black powder having a bulk density of 483 g/l and an average secondary particle size of 2 micrometers were obtained.

EXAMPLE 4

Production of a silicon oxycarbide molding

A homogeneous mixture was prepared by ultrasonic treatment from 100 g of a silicon oxycarbide powder prepared in accordance with Example 3, 40 g of a silicone resin of the formula

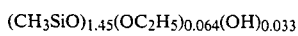
$(CH_3SiO)_{1.45}(OC_2H_5)_{0.064}(OH)_{0.033}$ and 100 ml of toluene. The toluene was then removed at 150° C. in a circulating air drying cabinet. Part of the composition thus obtained was compressed in a compression mold at 80° C. and 10 bar for 60 minutes to give a molding whose dimensions are $6 \times 10 \times 5$ mm. This molding was heated to 1300° C. in an argon-flushed tubular oven and was maintained at this temperature for 30 minutes.

After cooling, a black, smooth, defect-free molding was obtained. The volume shrinkage was 20.7 percent and the density was 1.82 $g/cm^3$. The molding was not electrically conductive, was very resistant to temperature changes and had a flexural strength of over 150 $N/mm^2$. No change in weight was observed after heating at 1000° C. for 10 hours in air.

What is claimed is:

1. A process for preparing moldings based on silicon oxycarbide, which comprises reacting a molding containing from 50 to 90 percent by weight of silicon oxycarbide having an average particle size of from 0.5 to 50 um with from 10 to 50 percent by weight of silicone resin of the formula

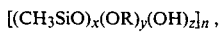
$[(CH_3SiO)_x(OR)_y(OH)_z]_n$, in which R is an alkyl radical having from 1 to 4 carbon atoms, x is in the range of from 1.4 to 1.5, y is in the range of from 0 to 0.08, z is in the range of from 0 to 0.08 and n is in the range of from 20 to 40, under a nonoxidizing atmosphere or in a vacuum at temperatures in the range of from 700 to 1500° C.

2. The process of claim 1, wherein the silicon oxycarbide is present in an amount of from 50 to 80 percent by weight.

3. The process of claim 1, wherein the silicon oxycarbide has an average particle size of from 0.5 to 25 um.

4. The process of claim 1, wherein the silicone resin is present in an amount of from 20 to 50 percent by weight.

5. The process of claim 1, wherein the silicon oxycarbide is spherical in shape and has an average particle size of from 0.5 to 15 um.

6. The process of claim 1, wherein the silicon oxycarbide is obtained from the pyrolysis of pulverulent, infusible and insoluble methylsilicic acids under an inert atmosphere or under a vacuum at temperatures in the range of from 800° to 1300° C.

7. The process of claim 6, wherein the methylsilicic acid powder is obtained by spray drying hydrosols containing methyltrimethoxysilanes.

* * * * *